Nov. 13, 1951  A. L. BOLTZEN  2,574,524
BIN FEEDING MECHANISM
Filed Nov. 19, 1949  2 SHEETS—SHEET 1

INVENTOR.
Adolph L. Boltzen
BY
ATTORNEY

Nov. 13, 1951  A. L. BOLTZEN  2,574,524
BIN FEEDING MECHANISM
Filed Nov. 19, 1949  2 SHEETS—SHEET 2
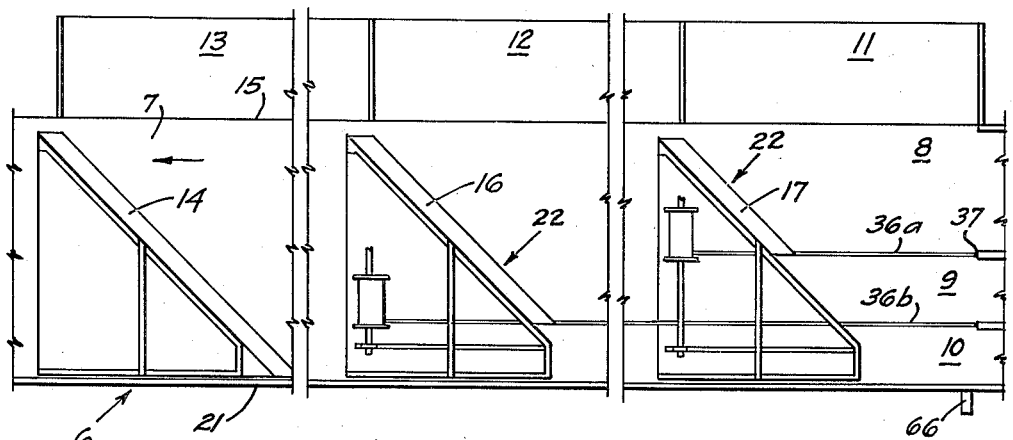
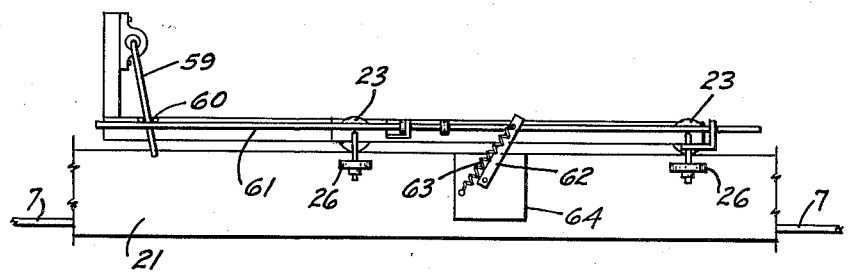
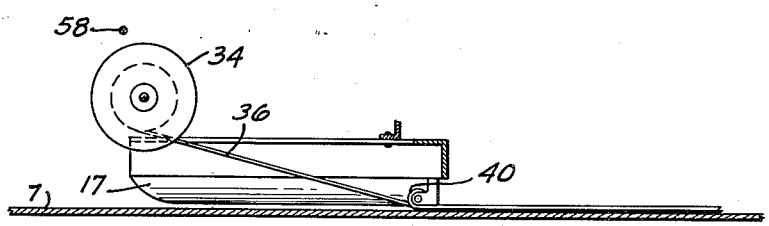
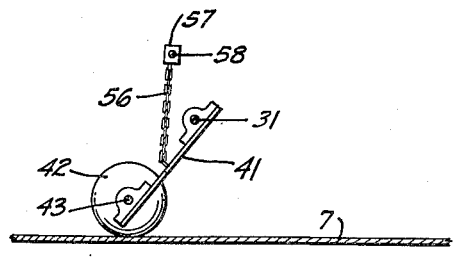
INVENTOR.
Adolph L. Boltzen
BY
Robert H. Eckhoff
ATTORNEY Patented Nov. 13, 1951

2,574,524

UNITED STATES PATENT OFFICE 2,574,524

BIN FEEDING MECHANISM

Adolph L. Boltzen, Brentwood, Calif.

Application November 19, 1949, Serial No. 128,303

7 Claims. (Cl. 198—188)

This invention relates to an improvement in conveyor constructions and particularly to a conveyor which is provided with a movable carriage effective to remove articles from a belt over a selected area thereof. The invention will be particularly described as it has been applied to a conveyor handling tomatoes, but it will be obvious to those skilled in the art that the conveyor construction is suited to the handling of various other articles.

In a typical packing house operation, tomatoes are graded as to size, the several sizes then being deposited upon different areas of a conveyor belt to transport the tomatoes to storage bins. The belt conveys the tomatoes of various sizes arranged in longitudinal rows; for example, if the tomatoes are graded into three sizes, a portion of the width of the belt will be taken up by tomatoes of a large size, an intermediate portion by tomatoes of a medium size and the remainder of the belt by tomatoes of small size.

In accordance with this invention, I provide a carriage which is movable by the belt in a direction opposite to that of the belt and which is effective to sweep the tomatoes from the belt, over the longitudinal edge of the belt and into an adjacent storage bin. When the carriage reaches its limit of travel, it is returned to its starting position adjacent the other end of the storage bin by the belt, whereupon it commences its sweeping travel once again. In this fashion, the device functions automatically and any manual labor for removal of the tomatoes from the belt is entirely eliminated. In addition, the means utilized to move the carriage opposite to the belt includes a flexible rope or cable which is utilized as a divider strip, the rope or cable resting on the belt and dividing one area from another to prevent the articles in one area from mixing with those in another area.

It is in general the broad object of the present invention to provide an improved conveyor of the type described and which includes a carriage operable by a conveyor belt for sweeping articles off any selected area of the belt and means for maintaining the belt area segregated into separate areas for various sizes of articles.

The invention includes other objects and features of advantage, some of which, together with the foregoing, will appear hereinafter wherein the present preferred form of conveyor embodying this invention is disclosed.

In the drawing accompanying and forming a part hereof,

Figure 1:
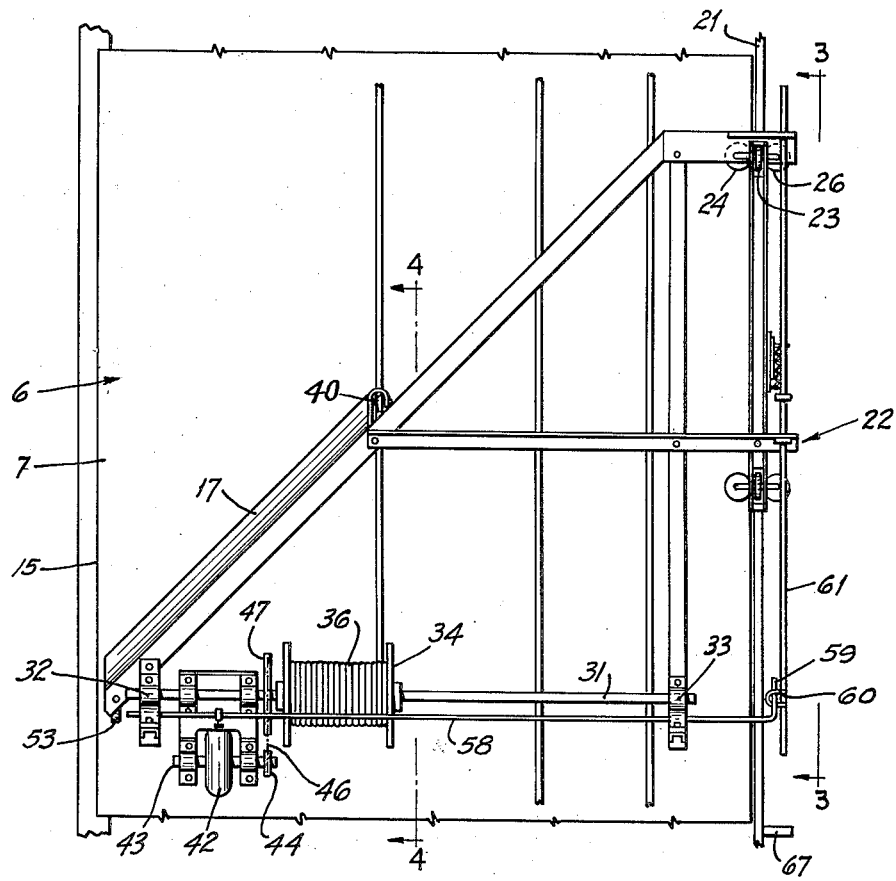
Figure 1 is a plan view of a typical belt construction, including a carriage embodying the present invention.

Figures 3 and 4 are respectively sections taken along lines 3—3 and 4—4 in Figure 1.

Figure 5 is a fragmentary view of a supporting wheel.

Figure 6 is a diagrammatic view illustrating the general assembly employed, some parts being omitted for clarity.

Referring to the drawing, and particularly to Figure 6, a conveyor generally indicated by numeral 6 is provided. This includes the belt 7 mounted for movement from right to left in Figure 6, the belt 7 being supported upon suitable supporting rollers and being moved by a suitable prime mover; the details of construction of the conveyor and the prime mover are conventional.

Upon such a belt, it is usual to deposit across the width of the belt articles of different grade; for example, one size of tomatoes may be deposited in the region indicated by numeral 8 and between edge 15 and cable 36a, another size of tomatoes in the region indicated by numeral 9 and between cables 36a and 36b, and a third size of tomatoes in the remaining space, indicated by numeral 10; it is usual to remove the several sizes of tomatoes into separate storage bins 11, 12 and 13, placed along one edge 15 of the belt.

In accordance with this invention, means are provided for effecting such removal automatically, preferably utilizing the movement of the conveyor. To this end, a fixed sweeping or scraping element 14 is provided at the extreme end of the travel of conveyor 6, the element being extended in the direction of and at an obtuse angle to the run of the conveyor to sweep articles thereon off over the longitudinal edge 15 of the belt 7 and into bin 13. The element 14 is suitably supported in a fixed position above the run of belt 7; it is effective, because it extends across the conveyor to sweep all articles on the conveyor off into a bin.

To remove other articles from the belt other elements 16 and 17 are provided. These, however, extend only partially across the belt. Thus, element 16 extends about three-fourths of the width and element 17 about one-half the width so that element 17 is effective first to remove articles from half the width of the belt, being upstream with respect to elements 16 and 14, while element 16 is effective to remove only those on a selected quarter of the belt. As many elements can be provided as are desired and of any coordinated length to sweep a selected belt area.

In accordance with this invention, means are provided for moving all but the final and fixed element to sweep articles off the belt and into a bin over the length of such bin so that the articles do not pile up at one end of the bin. To this end, the conveyor 6 is provided with a side wall 21. Mounted upon this are several movable carriages each generally indicated by numeral 22 and including spaced sets of wheels 23, 24 and 26 mounted upon the top and opposite sides of the side wall 21 to support the carriage for movement. Each carriage supports one of elements 16 or 17 in the direction of and at an angle to the run of the conveyor 6. Mounted at the rear of each carriage 22 in bearings 32 and 33 is a shaft 31. A drum 34 is secured to the shaft and a flexible cable 36, such as a rope, is wound about the drum and is secured thereto; the other end of the rope is secured to a fixed support 37 provided at the beginning of the run of the conveyor, as is shown in Figure 6. Each flexible cable runs along the surface of the belt 7, as is shown in Figure 4, and is then guided to the drum 34 over a pulley 40. In this way, the flexible cables serve as divider strips on the belt to prevent inadvertent mingling of the articles thereon.

A sub-frame 41 is mounted upon shaft 31 and includes a rubber-tired wheel 42 fixed to a shaft 43 journalled on the frame 41. A sprocket 44 is secured to the shaft 43 and a chain 46 is trained about the sprocket 44 and about another sprocket 47 provided on shaft 31. When the conveyor belt 6 is moved in one direction, the rubber-tired wheel 42 is rotated and the shaft 31 is turned by reason of the chain-sprocket connection. The relation of the parts is such that movement of the conveyor belt in one direction is effective to move the carriage in an opposite direction, whereby the element is effective to move articles thereon off over the longitudinal edge of the conveyor belt and into a bin.

Figure 2:
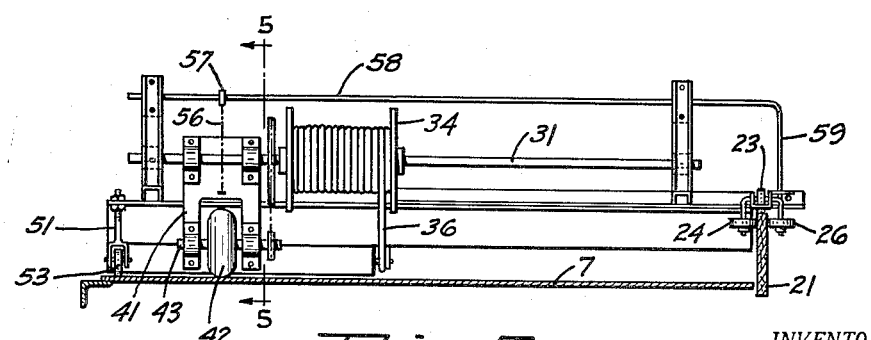
Figure 2 is an end view of the structure shown in Figure 1.

Each carriage includes a clevis 51 secured thereto adjacent the edge 15 of the belt, as appears in Figure 2. The clevis includes a small wheel 53 which rolls along the surface of the belt as the carriage is moved relative to the conveyor. In accordance with this invention, when the carriage reaches the end of its travel, the wheel 42 is raised from engagement with the belt whereby the belt returns the carriage to its starting position, the carriage then being rolled along the side member 21. It is to be noted that the small wheel 53 is provided at the end of the carriage and carries the full weight thereof at this point. Because of its small diameter, the frictional engagement between the small wheel 53 and the conveyor belt is sufficient to ensure that wheel 53 is normally stationary and in engagement with the surface of the conveyor belt and the belt is effective to return the carriage to its starting position. Lifting of the wheel 42 is accomplished by a chain 56 extended from a fixed element 57 on a rod 58. The rod 58 extends across the carriage and includes an end 59, engaged in an eye 60 (Figure 1) on a rod 61. The rod is slidably mounted on the side of the carriage and is held selectively in either of two positions by a toggle provided by a lever 62 and spring 63. Lever 62 is hinged on a bracket 64 on the side of the carriage and on the rod, the spring being extended between the hinge connection of the bracket and rod and the bracket to retain the rod in either an advanced or a retracted position.

To slide the rod, stops 66 and 67 are provided on the side wall 21 at the end of the travel of a carriage. As the carriage advances against the belt travel, rod 61 strikes stop 66 which moves it to the left in Figure 3 to raise the wheel 42. This permits the belt to return the carriage to its starting position whereat rod 61 engages stop 67 which slides the rod into the position shown in Figure 3 and wherein the wheel 42 is in engagement with belt 7. The carriage is then moved to slide the articles off the belt.

Referring again to Figure 6, it is to be noted that three different carriages have been indicated diagrammatically, that each carriage extends completely across the belt and that the movable carriages do not interfere with one another inasmuch as the travel of each is limited to the longitudinal length of the bin which it serves. It is to be pointed out that each flexible cable element 36 extends close to the surface of the conveyor belt and acts as a divider strip or guide between the various articles, thus preventing the various grades from being intermingled inadvertently upon the conveyor belt; the pulley 40 serves to keep the flexible cable element close to the belt surface as the element winds and unwinds on the drum.

I claim:

1. In combination, a conveyor belt movable continuously over a path to transport articles thereon, a plurality of bins along one edge of the belt to receive articles moved over an edge of the belt, a carriage supported for movement over the belt, a sweeping element on said carriage extending in the direction of and at an obtuse angle to the direction of travel of said belt, means on the carriage operated by said belt for moving the carriage opposite to the direction of travel of said belt between a first and a second station, and other means on the carriage and engaged with said belt and effective upon the carriage reaching the second station for moving the carriage in the direction of travel of said belt from the second to the first station.

2. In combination, a conveyor belt movable continuously over a path to transport articles thereon, a plurality of bins along one edge of the belt to receive articles moved over an edge of the belt, a sweeping element on said carriage extending in the direction of and at an obtuse angle to the direction of travel of said belt, means on the carriage rotated by said belt for moving the carriage opposite to the direction of travel of said belt between a first station and a second station, and other means on said carriage and engaged with said belt for returning said carriage, when the carriage arrives at the second station, from the second station to a starting position at the first station.

3. In combination, a conveyor belt movable continuously over a path to transport articles thereon, a plurality of bins along one edge of the belt to receive articles moved over an edge of the belt, and a plurality of carriages movable over the belt to sweep articles from the belt into one of said bins, each carriage including a drum thereon, a flexible cable wound on the drum and extended along the belt to an end thereof, a wheel on the carriage engaged with the belt for rotating the drum.

4. In combination, a conveyor belt movable continuously over a path to transport articles thereon, a plurality of bins along one edge of the belt to receive articles moved over an edge of the belt, and a plurality of carriages movable over the belt to sweep articles from the belt into one of said bins, each carriage including a drum thereon, a flexible cable wound on the drum and extended along the belt to an end thereof, a wheel on the carriage engaged with the belt for rotating the drum to move the carriage from one end to the other end of a path of travel, and means for rendering the wheel ineffective to move the carriage at the other end of said path and for returning the carriage to said one end.

5. In combination, a conveyor belt movable continuously over a path to transport articles thereon, a plurality of bins along one edge of the belt to receive articles moved over an edge of the belt, and a plurality of carriages movable over the belt to sweep articles from the belt into one of said bins, each carriage including a drum thereon, a flexible cable wound on the drum and extended along the belt to an end thereof, a wheel on the carriage engaged with the belt for rotating the drum to move the carriage from one end to the other end of a path of travel, and means for rendering the wheel ineffective to rotate the drum at the other end of said path of travel and until the carriage is returned to said one end.

6. In a device of the character described, a conveyor belt movable over a path in one direction, a carriage, a scraper element on said carriage extending in said one direction and at an obtuse angle to said one direction, a first moving means on said carriage effective during engagement of said first means with said belt to move said carriage in a direction opposite to said one direction over a predetermined carriage path of a length less than that of the belt, means at one end of said carriage path for rendering said first moving means ineffective to move said carriage, and a second moving means on said carriage normally engaged with said belt effective during disengagement of said first means from said belt to move said carriage with said belt over said predetermined path in said one direction, and means at the other end of said carriage path for rendering said second moving means ineffective and said first moving means effective to move said carriage.

7. In a device of the character described, a conveyor belt movable over a path in one direction, a carriage, a scraper element on said carriage extending in said one direction and at an obtuse angle to said one direction, a first moving means on said carriage effective to move said carriage in a direction opposite to said one direction over a predetermined carriage path of a length less than that of the belt, means at one end of said carriage path for rendering said first moving means ineffective to move said carriage, a second moving means on said carriage effective to move said carriage with said belt over said predetermined path in said one direction, and means at the other end of said carriage path for rendering said second moving means ineffective and said first moving means effective to move said carriage, and means for alternately rendering one of said moving means effective and the other moving means ineffective to move said carriage.

ADOLPH L. BOLTZEN.

REFERENCES CITED

The following references are of record in the file of this patent:

UNITED STATES PATENTS

| Number | Name | Date |
| --- | --- | --- |
| 1,481,542 | Dunsieth | Jan. 22, 1924 |
| 1,845,562 | Sandberg | Feb. 16, 1932 |
| 2,149,166 | Fitzgerald | Feb. 28, 1939 |